United States Patent
Ko

(10) Patent No.: US 6,904,093 B1
(45) Date of Patent: Jun. 7, 2005

(54) HORIZONTAL/VERTICAL SCANNING FREQUENCY CONVERTING APPARATUS IN MPEG DECODING BLOCK

(75) Inventor: Do-young Ko, Anyang (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/328,007

(22) Filed: Jun. 8, 1999

(30) Foreign Application Priority Data

Jun. 29, 1998 (KR) .......................................... 98-24996

(51) Int. Cl.$^7$ .............................................. H04N 7/12
(52) U.S. Cl. ............. 375/240.12; 375/240; 375/240.01; 375/240.16
(58) Field of Search ........................... 375/240, 240.01, 375/240.05, 240.12, 240.15, 240.16, 240.11; 348/400.11, 400.1, 459, 563, 556; 714/781; 386/68

(56) References Cited

U.S. PATENT DOCUMENTS

| | | | | |
|---|---|---|---|---|
| 5,392,071 A | * | 2/1995 | Richards et al. ........ | 375/240.11 |
| 5,539,467 A | * | 7/1996 | Song et al. ............ | 375/240.15 |
| 5,608,459 A | * | 3/1997 | Hashimoto et al. .... | 375/240.15 |
| 5,642,170 A | * | 6/1997 | Hackett et al. ............ | 348/459 |
| 5,652,823 A | * | 7/1997 | Eto .............................. | 386/68 |
| 5,754,241 A | * | 5/1998 | Okada et al. .......... | 375/240.05 |
| 5,841,475 A | * | 11/1998 | Kurihara et al. ....... | 375/240.15 |
| 5,854,799 A | * | 12/1998 | Okada et al. ................ | 714/781 |
| 5,867,219 A | * | 2/1999 | Kohiyama ............... | 348/400.1 |
| 5,889,890 A | * | 3/1999 | Heimburger ................ | 382/236 |
| 5,995,154 A | * | 11/1999 | Heimburger ................ | 348/448 |
| 6,300,981 B1 | * | 10/2001 | Kim et al. ................... | 348/563 |
| 6,577,349 B1 | * | 6/2003 | Yamaguchi et al. ........ | 348/556 |

FOREIGN PATENT DOCUMENTS

| | | | | |
|---|---|---|---|---|
| EP | 0 588 181 A1 | * | 3/1994 | ........... G06F/15/68 |
| EP | 0 648 046 | | 4/1995 | ............ H04N/5/44 |
| EP | 0 781 041 | | 6/1997 | ............ H04N/5/44 |
| EP | 0781041 B1 | | 11/1999 | |
| GB | 2 326 790 | | 12/1998 | ............ H04N/7/01 |

* cited by examiner

Primary Examiner—Allen Wong
(74) Attorney, Agent, or Firm—Sughrue Mion, PLLC

(57) ABSTRACT

A video signal processing apparatus, and more particularly, a horizontal/vertical scanning frequency changing apparatus in an MPEG decoding block for changing a method of scanning a decoded signal using an MPEG algorithm without adding an additional motion detecting memory in a decoding process is provided. According to the present invention, it is possible to reduce material expenses by doubling the horizontal/vertical scanning frequency of the video signal without adding the motion detecting memory and the signal interpolating memory in a process of restoring the signal of the MPEG decoding block and to prevent partial deterioration of picture quality during the signal interpolation depending on the motion information due to the restrictions on the memory capacity.

10 Claims, 3 Drawing Sheets

HORIZONTAL/VERTICAL SCANNING FREQUENCY CONVERTING APPARATUS IN MPEG DECODING BLOCK

BACKGROUND OF THE INVENTION

1. Field of the Invention

The present invention relates to a video signal processing apparatus, and more particularly, to a horizontal/vertical scanning frequency converting apparatus in an MPEG decoding block for converting a method of scanning a decoded signal using an MPEG algorithm without adding an additional motion detecting memory in a decoding process.

2. Description of the Related Art

In general, the compression of a video signal by an MPEG standard is performed by a spacial correlation and a temporal correlation between frames using a variable length code according to the generation probability of a code.

A forward prediction from a past reproduced image and a backward prediction from a future reproduced image are performed together using a frame memory or a field memory in a signal processing operation for compressing the video signal by the MPEG standard.

Three types of images, i.e., an I picture, a P picture, and a B picture are defined in the MPEG standard in order to realize such a bidirectional prediction.

The I picture, the P picture, and the B picture respectively refer to an intra-encoded image (an image encoded using information of one frame), a predictive encoded image (an image encoded using inter-frame forward prediction), and a bidirectionally predictive encoded image (an image encoded using bidirectional prediction).

Processes of restoring a compressed image signal according to a conventional technology will be described in detail with reference to FIG. 1.

As shown in FIG. 3, data is input to a decoding block 1000a (FIG. 1) in the order of an I picture, a P picture, a B picture, and another B picture. Data is output from the decoding block 1000a in the order of the I picture (screen #1), the B picture (screen #2), the B picture (screen #3), and the P picture (screen #4).

Accordingly, a reverse discrete cosine transformed I picture is stored in a first prediction memory 105 by a reverse DCT unit 102 of the decoding block 1000a. When forward error data with respect to the P picture is output from the reverse DCT unit 102, the data of the I picture stored in the first prediction memory 105 is output through a third switching unit 109. The output data is applied to a mixer 103 through a second switching unit 108 and is stored in a second prediction memory 106 after the forward error data is added thereto.

When bidirectional error data with respect to the B picture is output, the data of the I picture and the P picture stored in the first and second prediction memories 105 and 106 are calculated by a mean operator 107 and applied to the mixer 103. The bidirectional error data is added to the calculated data. Then, the addition result is output through the third switching unit 109.

The I picture is generated by self-data without prior or posterior screen information. The P picture is generated by adding mean differential information of the I picture or the P picture two screens prior to the forward error data. The B pictures obtained by inserting two screens between the I (or P) picture and the P picture are generated by adding the differential information of the first previous I (or P) picture, the operation value from the next P picture, and the bidirectional error data to each other.

In general, the flicker and resolution of a screen are improved by doubling the horizontal or vertical frequency in processing a digital video signal.

In order to double the horizontal or vertical scanning frequency of a screen, the restored signal should be progressive scan converted or double scan converted by a three dimensional processing block 1000b. Since it is necessary to additionally provide a signal interpolating memory 111 and a motion detecting memory 112 for this, material expenses increase. Partial deterioration of picture quality occurs during the interpolation of a signal according to motion information and due to the restriction on the capacity of a memory.

SUMMARY OF THE INVENTION

To solve the above problem, it is an objective of the present invention to provide a horizontal/vertical scanning frequency converting apparatus in an MPEG decoding block without adding a signal interpolating memory and a motion detecting memory by simultaneously converting a scanning method for doubling the horizontal/vertical scanning frequency of the video signal when a signal is restored by an MPEG decoder using motion information.

Accordingly, to achieve the above objective, there is provided an apparatus for changing a horizontal/vertical scanning frequency in a decoding block for restoring an MPEG signal including a prediction memory for storing I picture data and forward prediction restored P picture data and a mean operating unit for generating calculated mean data for bidirectional prediction, comprising a B picture memory for storing B picture data, the B picture data having been bidirectionally prediction restored by the decoding block, a prediction memory switching portion for switching data output from the decoding block to the prediction memory or the B picture memory depending on the kind of picture being processed, and an output data switching portion for increasing the horizontal or vertical frequency of data stored in the prediction memory and the B picture memory with respect to a general scanning method, using the motion vector of the decoding block and outputting the data.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

A double scan converting method and a progressive scan converting method are used in order to double the horizontal or vertical scanning frequency of a video signal.

The double scan converting method is a video signal format converting method for improving a flicker phenomenon by inserting an interpolated field signal between field signals of a video signal using a motion vector, thus doubling the vertical scanning frequency of an image from 60 Hz to 120 Hz in an NTSC video transmission format, and from 50 Hz to 100 Hz in a PAL format.

The progressive scan converting method is a format converting method for improving picture quality by inserting an interpolated line signal between the respective horizontal lines of a field signal using a motion vector without converting the vertical frequency of a video signal, thus doubling the horizontal scanning frequency of an image.

Figure 1:
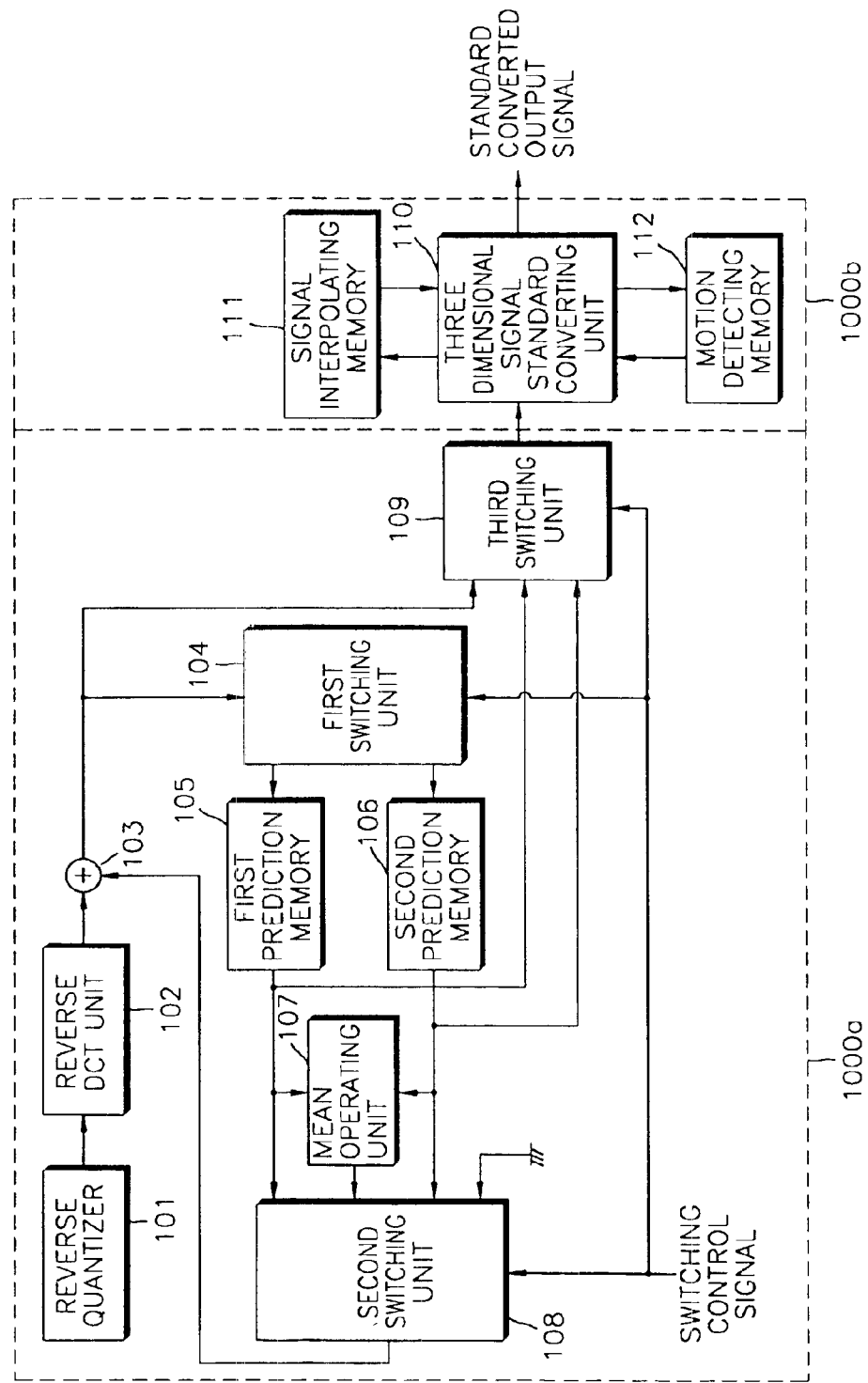
FIG. 1 shows the structure of a horizontal/vertical scanning frequency converting apparatus according to a conventional technology.
Figure 2:
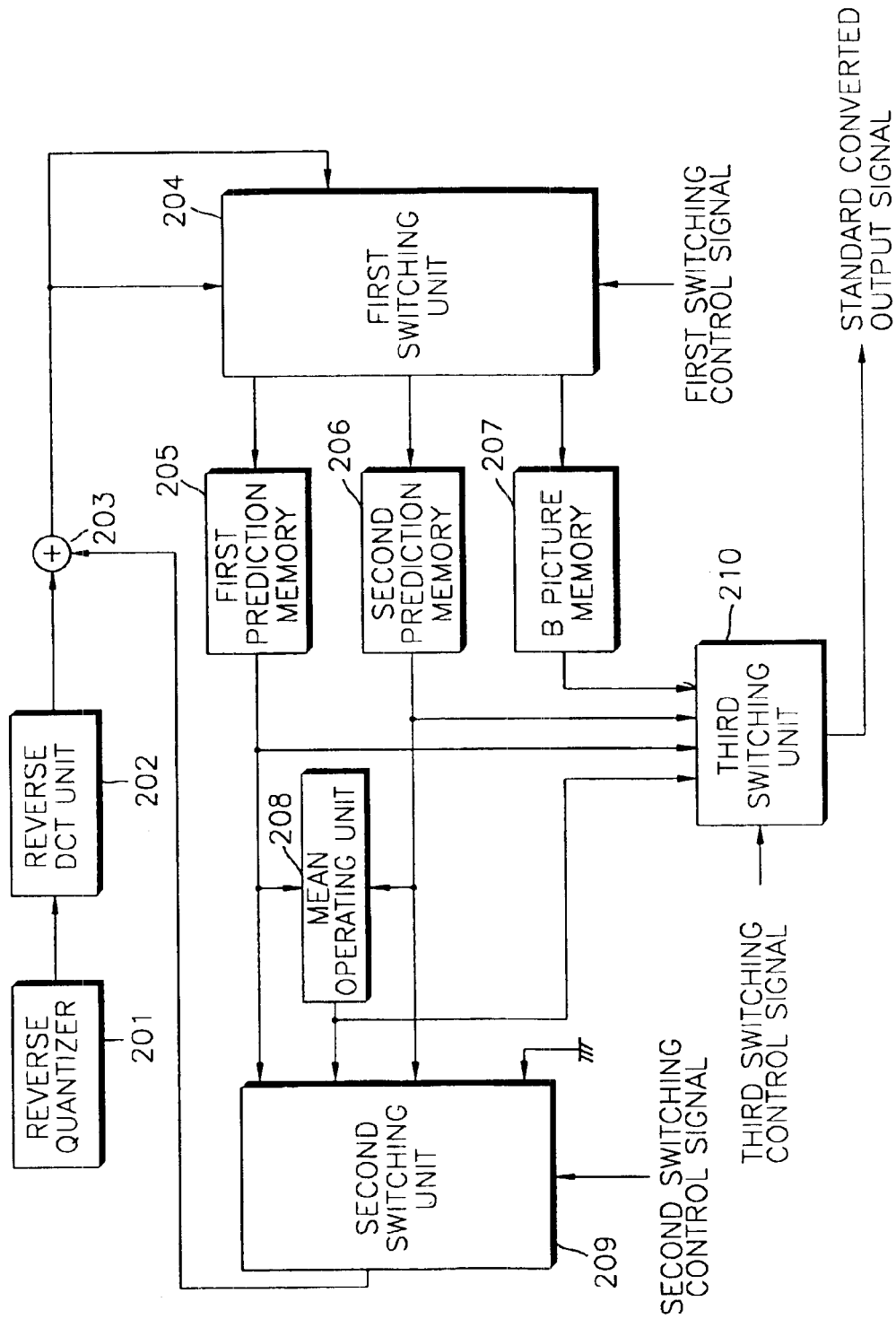
FIG. 2 shows the structure of a horizontal/vertical scanning frequency converting apparatus according to an MPEG decoding block of the present invention.

As shown in FIG. 2, a horizontal/vertical scanning frequency converting apparatus in an MPEG decoding block according to the present invention includes a reverse quantizer 201, a reverse DCT unit 202, a mixer 203, a first switching unit 204, a first prediction memory 205, a second prediction memory 206, a B picture memory 207, a mean operating unit 208, a second switching unit 209, and a third switching unit 210.

A double scan converting operation for producing a vertical frequency which is double that of a general scanning method will be described for the horizontal/vertical scanning frequency converting apparatus according to the present invention.

A transmitted video signal is reverse quantized and reverse discrete cosine transformed by the reverse quantizer 201 and the reverse DCT unit 202 into pictures and output depending on a prediction encoding method by the MPEG standard.

The MPEG standard incorporates three types of pictures: an I picture, a P picture, and a B picture, each of which has a corresponding prediction encoding method. The I picture is a frame encoded using only information of a corresponding screen. The P picture is a frame generated by performing prediction from the I picture or the P picture of a previous screen. The B picture is a frame generated by performing bidirectional prediction from pictures of past and future screens.

Figure 3:
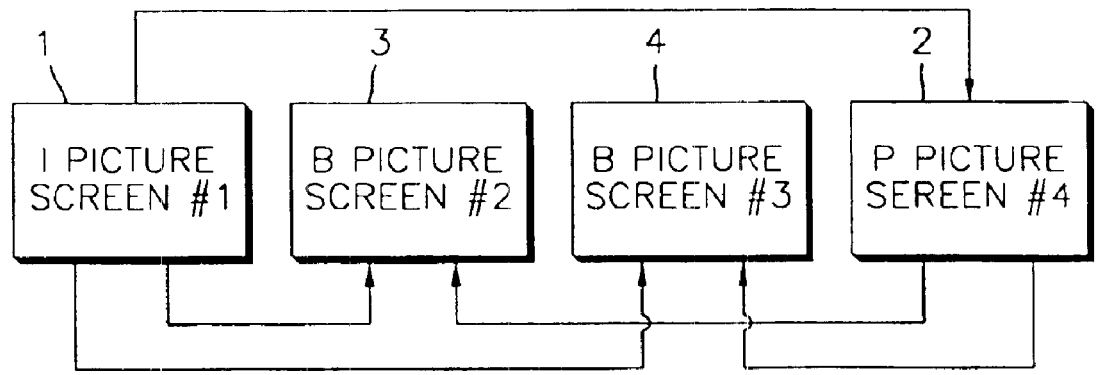
FIG. 3 shows the order in which a frame is encoded and displayed according to an MPEG standard.

As shown in FIG. 3, encoded data is input to the decoding block in the order of an I picture, a P picture, and two B pictures.

Then, I picture data which is the first image data of the group of pictures (GOP) is reverse quantized and reverse discrete cosine transformed and is input to the mixer 203. Since the I picture is comprised of only information of a corresponding screen and no prediction is necessary, a second switching control signal of the second switching unit 209 causes the second switching unit 209 to output a ground signal to the terminal mixer 203. Meanwhile, a first switching control signal controls the first switching unit 204 so that the I picture data is stored in the prediction memory 205 without being predicted.

Error data for forward prediction of a P picture which is the second image data of the GOP is reverse discrete cosine transformed and input to the mixer 203. At this time, the I picture data stored in the first prediction memory 205 is output to the mixer 203 through the second switching unit 209. Accordingly, the error data of the P picture is added to the data of the I picture by the mixer 203, thus a forward predicted picture P is obtained. The data of the forward predicted picture P is switched by the first switching unit to the second prediction memory 206 where it is stored.

Then, the error data for bidirectionally predicting the B1 picture which is the third image data of the GOP is reverse discrete cosine transformed and is input to the adder 203. At this time, the I picture stored in the first prediction memory 205 and the P picture stored in the second prediction memory 206 are read and mean calculated by the mean operator 208. The mean operated data is output to the mixer 203 through the second switching unit 209 in response to the second switching control signal. Then, the error data for the bidirectional prediction is added to the bidirectional mean calculated data. The bidirectionally predicted B1 picture is output from the mixer 203.

The bidirectionally predicted B2 picture is received by the first switching unit 204 and is stored in the B picture memory 207.

When the B1 picture data is stored in the B picture memory 207, the frequency of the read clock signal of the first and second prediction memories 205 and 206 and the B picture memory 207 is set to be double that of the general scanning method. The I picture data stored in the first prediction memory 205 is continuously read repeatedly. The same I picture is output twice through the third switching unit 210 as shown in FIG. 4B.

Then, error data for bidirectionally predicting a B2 picture which is the fourth image data of the GOP is reverse discrete cosine transformed and input to the mixer 203. At this time, the I picture stored in the first prediction memory 205 and the P picture stored in the second prediction memory 206 are read and are mean calculated by the mean operating unit 208. The mean calculated data is output to the mixer 203 through the second switching unit 209 in response to the second switching control signal. Then, the error data for bidirectionally predicting the B2 picture is added to the bidirectional mean calculated data. The bidirectionally predicted picture B2 is output from the mixer 203.

If the motion information transmitted from a transmitting side when the bidirectionally predicted B picture is operated is not larger than a certain threshold value, the B picture data stored in the B picture memory 207 is read two times faster using a clock signal having double the frequency of that used in a general scanning method and is output twice repeatedly. If the motion information is larger than the threshold value, the operation output of the data stored in the first and second prediction memories 205 and 206 is quickly read from the mean operating unit 208 and output.

Figure 4A:
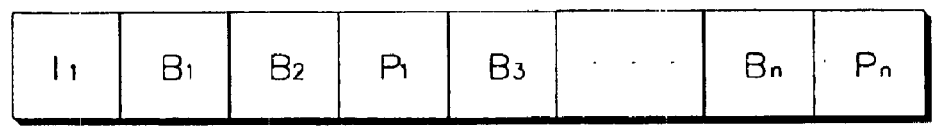
FIG. 4A shows the order in which picture data is output in a general scanning method.
Figure 4B:
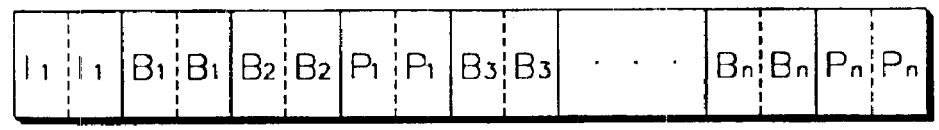
FIG. 4B shows the order in which picture data is output in a double scan converted mode.

The respective pictures are each output twice as shown in FIG. 4B by repeating the above operation, as compared to respective pictures being output once in the general scanning method shown in FIG. 4A. Accordingly, the field frequency is doubled. Thus, it is possible to obtain a double scan converted output signal in which the vertical scanning frequency of the video signal is doubled.

A progressive scan converting operation for producing a horizontal scanning frequency which is double that of the general scanning method will be described for the horizontal/vertical scanning frequency converting apparatus according to the present invention.

The operation of the structure of FIG. 2 is basically the same for the progressive scan converting operation as for the double scan converting operation. It is possible to reduce the capacity of the B picture memory 207 by using a line memory without a field or frame memory like in the double scan conversion.

The I picture or P picture data stored in the first and second prediction memories 205 and 206 by the forward or bidirectional prediction operates in the same way as that of the double scan conversion.

The data stored in the first and second prediction memories 205 and 206 or the 13 picture memory 207 to be output to the third switching unit 210 is read in order to insert a new line signal between horizontal lines. To achieve this, a switching control is performed so as to repeatedly read the data of a previous horizontal line and output the read data to between the horizontal lines of the respective pictures when the magnitude of the motion vector is no more than a reference value and to read the corresponding line data of a previous picture stored in the first and second prediction memories 205 and 206 and insert the read data into between the horizontal lines of the respective pictures when the magnitude of the motion vector is larger than the reference value.

Unlike the above method, it is possible to double the horizontal scanning frequency by performing a switching control so as to repeat the data of a previous horizontal line when the value of the motion vector is no more than a reference value and to insert mean calculated data of the respective corresponding lines of the pictures stored in the first and second prediction memories 205 and 206, calculated by the mean operating unit 208 when the value of the motion vector is larger than the reference value.

It is possible to simply perform restoration of a signal and three dimensional format conversion for converting a horizontal/vertical scanning frequency, for example, the double scan conversion or the progressive scan conversion, in the MPEG decoding block by the above operation, without adding a signal interpolating memory and a motion detecting memory.

As mentioned above, according to the present invention, it is possible to reduce material expenses by doubling the horizontal/vertical scanning frequency of the video signal and by not adding the motion detecting memory and the signal interpolating memory in a process of restoring the signal of the MPEG decoding block and to prevent partial deterioration of picture quality which occurs during the signal interpolation depending on the motion information due to the restrictions on the memory capacity.

What is claimed is:

1. An apparatus for changing a horizontal or vertical scanning frequency in a decoding block for restoring an MPEG signal including a prediction memory for storing I picture data and forward prediction restored P picture data and a mean operating unit for generating calculated mean data for bidirectional prediction, comprising:

a B picture memory for storing B picture data, the B picture data having been bidirectionally prediction restored by the decoding block;

a prediction memory switching portion for switching the I picture data, the P picture data and the B picture data output from the decoding block to the prediction memory or the B picture memory depending on the type of picture; and an output data switching portion for performing switching control to increase a frequency with which data is output from the prediction memory and the B picture memory with respect to a general scanning method, using a motion vector of the decoding block, and outputting the data, wherein the output data switching portion performs the switching control so as to repeat data of a corresponding horizontal line of a previous picture between horizontal lines of a picture when the value of a motion vector is no more than a reference value and to insert corresponding line data of a previous picture stored in the prediction memory between the horizontal lines of the picture when the value of the motion vector is larger than the reference value.

2. The apparatus of claim 1, wherein a period of a data read from the prediction memory and the B picture memory is reduced to half by setting read clock frequencies of the prediction memory and the B picture memory to be two times higher than the read clock frequencies of a general scanning method.

3. The apparatus of claim 1, wherein the output data switching portion performs the switching control so as to double the vertical scanning frequency of a video signal by repeating output data twice in units of a picture with respect to a general scanning method.

4. The apparatus of claim 1, wherein the output data switching portion performs the switching control so as to double the horizontal scanning frequency or the vertical scanning frequency.

5. An apparatus for changing a horizontal or vertical scanning frequency in a decoding block for restoring an MPEG signal including a prediction memory for storing I picture data and forward prediction restored P picture data and a mean operating unit for generating calculated mean data for bidirectional prediction, comprising:

a B picture memory for storing B picture data, the B picture data having been bidirectionally prediction restored by the decoding block;

a prediction memory switching portion for switching the I picture data, the P picture data and the B picture data output from the decoding block to the prediction memory or the B picture memory depending on the type of picture; and an output data switching portion for performing switching control to increase a frequency with which data is output from the prediction memory and the B picture memory with respect to a general scanning method, using a motion vector of the decoding block, and outputting the data, wherein the output data switching portion performs the switching control so as to repeat the data of a corresponding horizontal line of a previous picture between horizontal lines of a picture when the value of a motion vector is no more than a reference value and to insert the calculated line mean data of the mean operating portion between the horizontal lines of the picture when the value of the motion vector is larger than the reference value.

6. The apparatus of claim 5, wherein a period of a data read from the prediction memory and the B picture memory is reduced to half by setting read clock frequencies of the prediction memory and the B picture memory to be two times higher than the read clock frequencies of a general scanning method.

7. The apparatus of claim 5, wherein the output data switching portion performs the switching control so as to double the vertical scanning frequency of a video signal by repeating output data twice in units of a picture with respect to a general scanning method.

8. The apparatus of claim 5, wherein the output data switching portion performs the switching control so as to double the horizontal scanning frequency or the vertical scanning frequency.

9. An apparatus for restoring an MPEG signal and converting a horizontal or vertical scanning frequency of the MPEG signal, the apparatus comprising:

a decoding block for decoding the MPEG signal to generate I picture data which has been restored, P picture data which has been forward prediction restored based on the I picture data, and B picture data which as been bidirectionally prediction restored based on the I picture data or the P picture data;

a first prediction memory for storing the I picture data output from the decoding block;

a second prediction memory for storing the P picture data;

a B picture memory for storing the B picture data;

a prediction memory switching portion for switching the I picture data, the P picture data and B picture data generated by the decoding block to the first prediction memory, the second prediction memory or the B picture memory; and an output data switching portion for performing switching control to change a frequency with which the I picture data, the P picture data and B picture data are output from the first prediction memory, the second prediction memory and the B picture memory so as to double a horizontal scanning frequency or a vertical scanning frequency of the MPEG signal, wherein the output data switching portion performs the switching control so as to repeat data of a corresponding horizontal line of a previous picture between horizontal lines of a picture when the value of a motion vector is not more than a reference value and to insert corresponding line data of a previous picture stored in the prediction memory between the horizontal lines of the picture when the value of the motion vector is larger than the reference value.

10. An apparatus for restoring an MPEG signal and converting a horizontal or vertical scanning frequency of the MPEG signal, the apparatus comprising:

a decoding block for decoding the MPEG signal to generate I picture data which has been restored, P picture data which has been forward prediction restored based on the I picture data, and B picture data which as been bidirectionally prediction restored based on the I picture data or the P picture data;

a first prediction memory for storing the I picture data output from the decoding block;

a second prediction memory for storing the P picture data;

a B picture memory for storing the B picture data;

a prediction memory switching portion for switching the I picture data, the P picture data and B picture data generated by the decoding block to the first prediction memory, the second prediction memory or the B picture memory; and an output data switching portion for performing switching control to change a frequency with which the I picture data, the P picture data and B picture data are output from the first prediction memory, the second prediction memory and the B picture memory so as to double a horizontal scanning frequency or a vertical scanning frequency of the MPEG signal, wherein the output data switching portion performs the switching control so as to repeat the data of a corresponding horizontal line of a previous picture between horizontal lines of a picture when the value of a motion vector is not more than a reference value and to insert the calculated line mean data of the mean operating portion between the horizontal lines of the picture when the value of the motion vector is larger than the reference value.

* * * * *